United States Patent [19]

Santandrea et al.

[11] Patent Number: 5,240,235
[45] Date of Patent: Aug. 31, 1993

[54] APPARATUS FOR MAKING ELECTRIC MOTOR PARTS EMPLOYING PALLET WITH REMOVABLE WORKPIECE HOLDER

[75] Inventors: Luciano Santandrea; Massimo Lombardi, both of Florence, Italy

[73] Assignee: Axis USA, Inc., Marlborough, Mass.

[21] Appl. No.: 745,404

[22] Filed: Aug. 15, 1991

Related U.S. Application Data

[62] Division of Ser. No. 591,272, Oct. 1, 1990, Pat. No. 5,065,499, which is a division of Ser. No. 326,012, Mar. 20, 1989, Pat. No. 4,965,924.

[30] Foreign Application Priority Data

Dec. 16, 1988 [IT] Italy ............................. 68113 A/88

[51] Int. Cl.⁵ ............................................. H02K 15/00
[52] U.S. Cl. ............................. 269/50; 29/732; 29/799; 29/823; 269/88; 269/309
[58] Field of Search ............... 29/596, 598, 732, 736, 29/48.5 A, 799, 823; 269/50, 51, 309, 310, 56, 88; 198/803.01, 456.1

[56] References Cited

U.S. PATENT DOCUMENTS

| | | |
|---|---|---|
| 4,110,896 | 9/1978 | Roiko .................................... 29/749 |
| 4,291,451 | 9/1981 | Barrera ................................. 29/736 |
| 4,531,284 | 7/1985 | Matsuura et al. ..................... 29/784 |
| 4,553,321 | 11/1985 | Zihlmann et al. .................... 29/598 |
| 4,713,883 | 12/1987 | Santandrea et al. .................. 29/736 |
| 4,815,673 | 3/1989 | Wheeler .............................. 242/7.09 |

FOREIGN PATENT DOCUMENTS

| | | |
|---|---|---|
| 0210669 | 2/1987 | European Pat. Off. . |
| 0215353 | 3/1987 | European Pat. Off. . |
| 3330687 | 3/1985 | Fed. Rep. of Germany . |
| 61-019534 | 1/1986 | Japan . |

Primary Examiner—Carl E. Hall
Attorney, Agent, or Firm—Robert R. Jackson; Karen G. Horowitz

[57] ABSTRACT

A pallet system for supporting a workpiece (such as an electric motor stator or rotor) during processing of the workpiece includes a pallet member on which a workpiece holder can be removably placed. The workpiece holder may have multiple workpiece-engaging sites, each of which is adapted to hold a differently configured workpiece, and multiple pallet-engaging sites, each of which is associated with a respective one of the workpiece-engaging sites and any one of which can be used to engage the pallet so that the workpiece holder can hold a workpiece of the appropriate configuration at the associated workpiece-engaging site. Methods and apparatus for storing and manipulating the workpiece holders are also disclosed.

25 Claims, 4 Drawing Sheets

APPARATUS FOR MAKING ELECTRIC MOTOR PARTS EMPLOYING PALLET WITH REMOVABLE WORKPIECE HOLDER

This application is a division of application Ser. No. 591,272, filed Oct. 1, 1990, which has issued as U.S. Pat. No. 5,065,499, and which in turn is a division of application Ser. No. 326,012, filed Mar. 20, 1989, which has issued as U.S. Pat. No. 4,965,924.

BACKGROUND OF THE INVENTION

This invention relates to methods and apparatus for making electric motor parts (e.g., the stators and rotors for electric motors), and more particularly to pallet systems for supporting such parts during manufacture.

The stators and rotors for electric motor parts are typically made on highly automated assembly lines. Each stator or rotor is typically conveyed along the assembly line by positioning it on a workpiece holder. Each workpiece holder is mounted on a pallet which is the element actually engaged by the conveyor system in order to support and convey the associated stator or rotor along the assembly line. Because precise positioning of the stator or rotor relative to the machine tools located along the assembly line is..required, all elements of the workpiece support system must securely engage one another so that there is no looseness or "play" in the support system. On the other hand, most assembly lines must be able to manufacture more than one size or type of motor. It would therefore be desirable to have a workpiece support system which could readily adapt to supporting motor parts of different sizes and/or types.

In view of the foregoing, it is an object of this invention to provide a workpiece support system which both supports a workpiece securely and which can quickly and easily change to support different workpieces in an equally secure manner.

It is another object of this invention to provide improved pallet systems for use in manufacturing electric motor parts.

SUMMARY OF THE INVENTION

These and other objects of the invention are accomplished in accordance with the principles of the invention by providing a pallet system including a pallet member having means for supporting and releasably engaging a workpiece holder, preferably at any one of a plurality of pallet-engaging sites on the workpiece holder. The workpiece holder also preferably has a plurality of workpiece-engaging sites, each of the workpiece-engaging sites being associated with a respective one of the pallet-engaging sites so that, when the workpiece holder is engaged by the pallet at a particular pallet-engaging site, the workpiece holder can engage a workpiece at the workpiece-engaging site associated with that pallet-engaging site. When the workpiece holder is engaged by the pallet, the pallet supports the workpiece holder very securely. However, a quick release connection is used between the pallet and the workpiece holder so that the workpiece holder can be quickly removed from the pallet and either repositioned on the pallet using a different pallet-engaging site or completely replaced by another workpiece holder. Apparatus for repositioning or replacing workpiece holders as described above is also disclosed.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
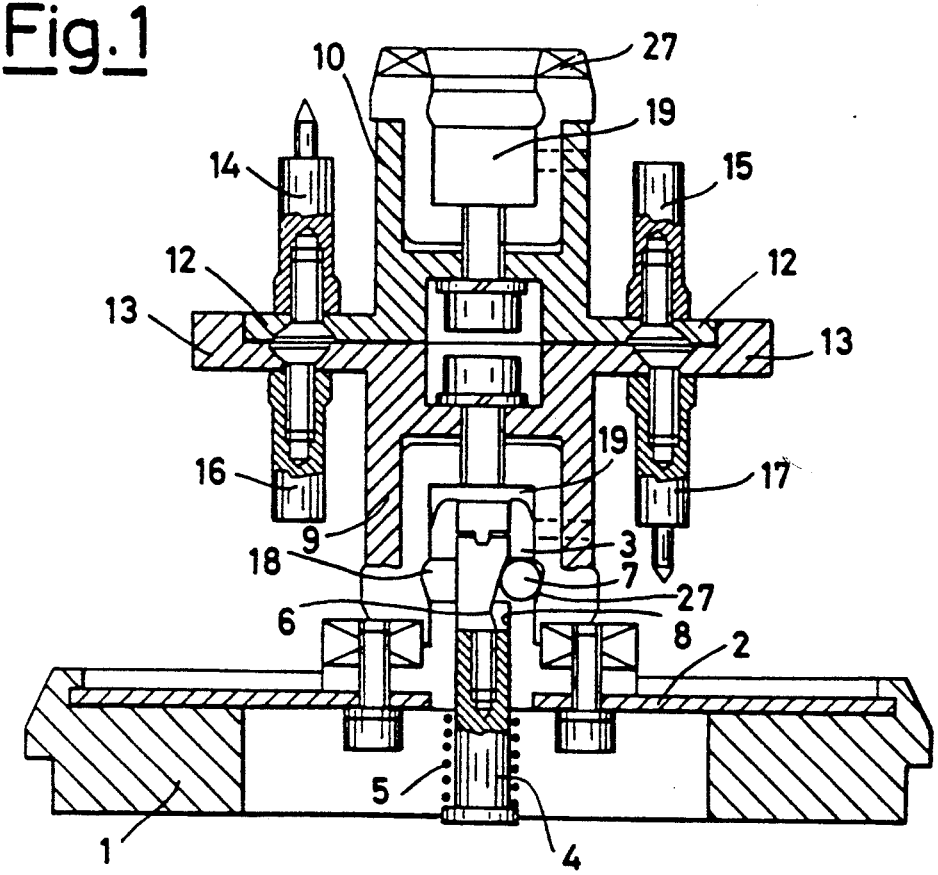
FIG. 1 is an elevational sectional view of an illustrative embodiment of a pallet and workpiece holder constructed in accordance with the principles of this invention.
Figure 2:
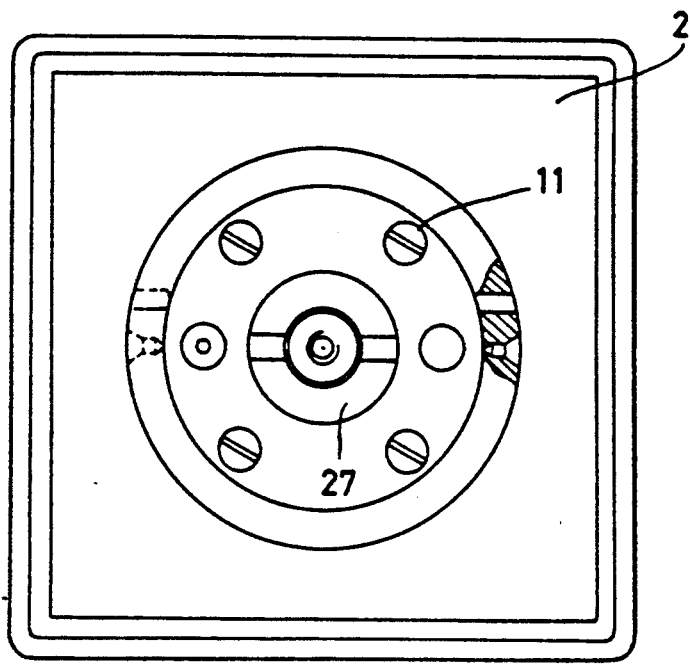
FIG. 2 is a top plan view of the apparatus of FIG. 1.

The embodiment shown in FIGS. 1 and 2 has a pallet 1 having a base plate 2 onto which is screwed a substantially cylindrical hollow part 3 which slidably receives a pin 4 urged downwardly by spring 5. The portion of pin 4 inside part 3 has a grooved or recessed part 6 with inclined sidewalls acting on ball 7 inside an opening 8 in cylindrical part 3.

The workpiece holder comprises a double body 9, 10 constructed in two separate parts held together by screws 11. Each body has a flange 12, 13 to which pins 14, 17 and supports 15, 16 are screwed to hold a workpiece and avoid accidental rotary or oscillatory movements of the workpiece. In the particular embodiment shown in the drawings, the workpiece holder is adapted to hold an electric motor stator, but it will be apparent that the workpiece holder could be adapted to hold other parts such as an electric motor rotor.

The central part of bodies 9 and 10 is shaped to fit into the boring of the type of stator it will carry when the relevant body is turned upwards on the pallet. The bodies 9 and 10 with their pins 14, 17 and supports 15, 16 are therefore typically designed to hold two stators of different dimensions. Therefore, when changing from one type of stator to the other, it is sufficient to rotate the part formed by bodies 9, 10 relative to pallet base 2.

The stator holder is automatically locked to the pallet because the inclined sidewalls of pin 4 (which is pushed downwardly by spring 5) push ball 7 outwardly of cylindrical part 3 into the hollow part 19 of body 9 (or 10) until the ball rests inside annular groove 18. Means (described below) at various assembly line stations are provided for pushing pin 4 up in order to disengage the stator holder from cylindrical part 3, thus permitting its rotation in order to present the opposite body designed to accommodate the other type of stator.

Figure 3:
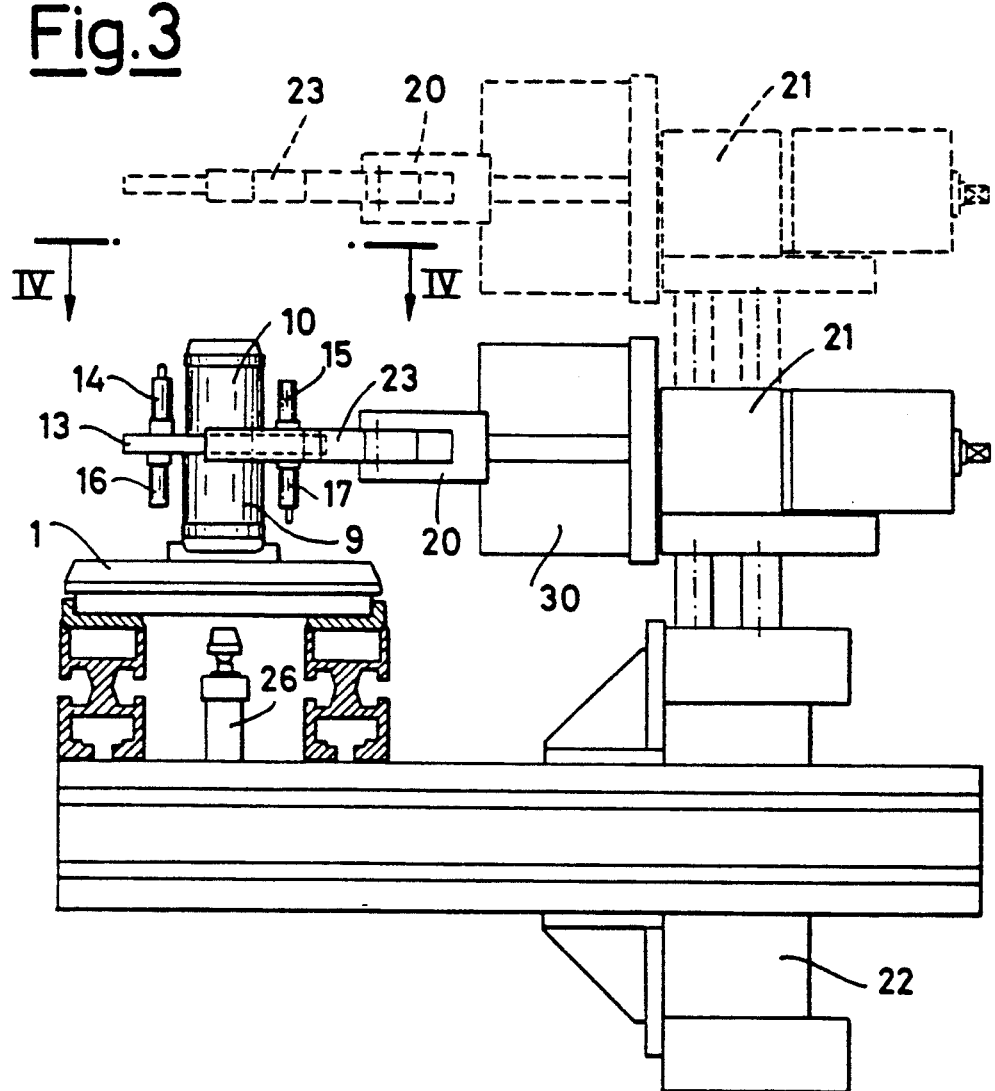
FIG. 3 is an elevational view of an illustrative embodiment of apparatus constructed in accordance with this invention for repositioning the workpiece holder of FIG. 1 on the pallet of FIG. 1 also in accordance with this invention.
Figure 4:
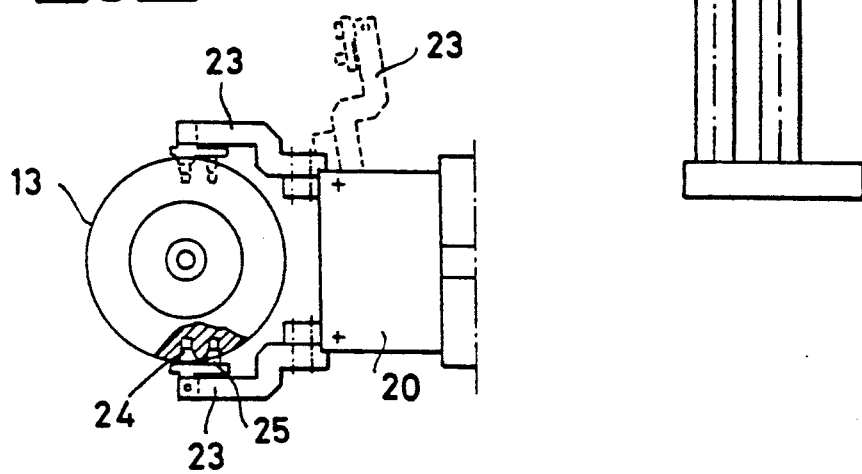
FIG. 4 is a partial plan view taken along the line IV—IV in FIG. 3.

FIGS. 3 and 4 show a device which can be placed at the start of an assembly line to rotate the double body 9, 10 as described above.

The device includes a gripper 20, a rotating cylinder 21 and a linear unit 22. The device is normally in the upper position (shown in broken lines in FIG. 3) with gripper 20 open. Pallet 1 stops at a conveyor stop gate (not shown because entirely conventional and well known). Linear unit 22 goes down with the gripper jaws 23 of gripper 20 apart. (Alternatively, the same result could be achieved by horizontal movement of gripper 20 and cylinder 21.) Gripper jaws 23 close around the stator holder, the pins 24 and 25 of jaw 23 engaging openings in body 9, 10. Cylinder 26, located under the transport system, pushes pin 4 upward, thereby disengaging body 9 (or 10) as explained above. Linear unit 22 moves upward, lifting up the stator holder. In an upper position, gripper 20 rotates 180 degrees Linear unit 22 then goes down and lowers the grooved part 27 of the lower body onto part 3 on the pallet. Cylinder 26 then goes back down so that the stator holder is again locked to the pallet as described above.

The present invention can also be advantageously employed in assembly lines or stator production lines featuring machines with automated re-tooling, i.e., with machines in which the tool parts designed for processing various workpieces are changed automatically.

Figure 5:
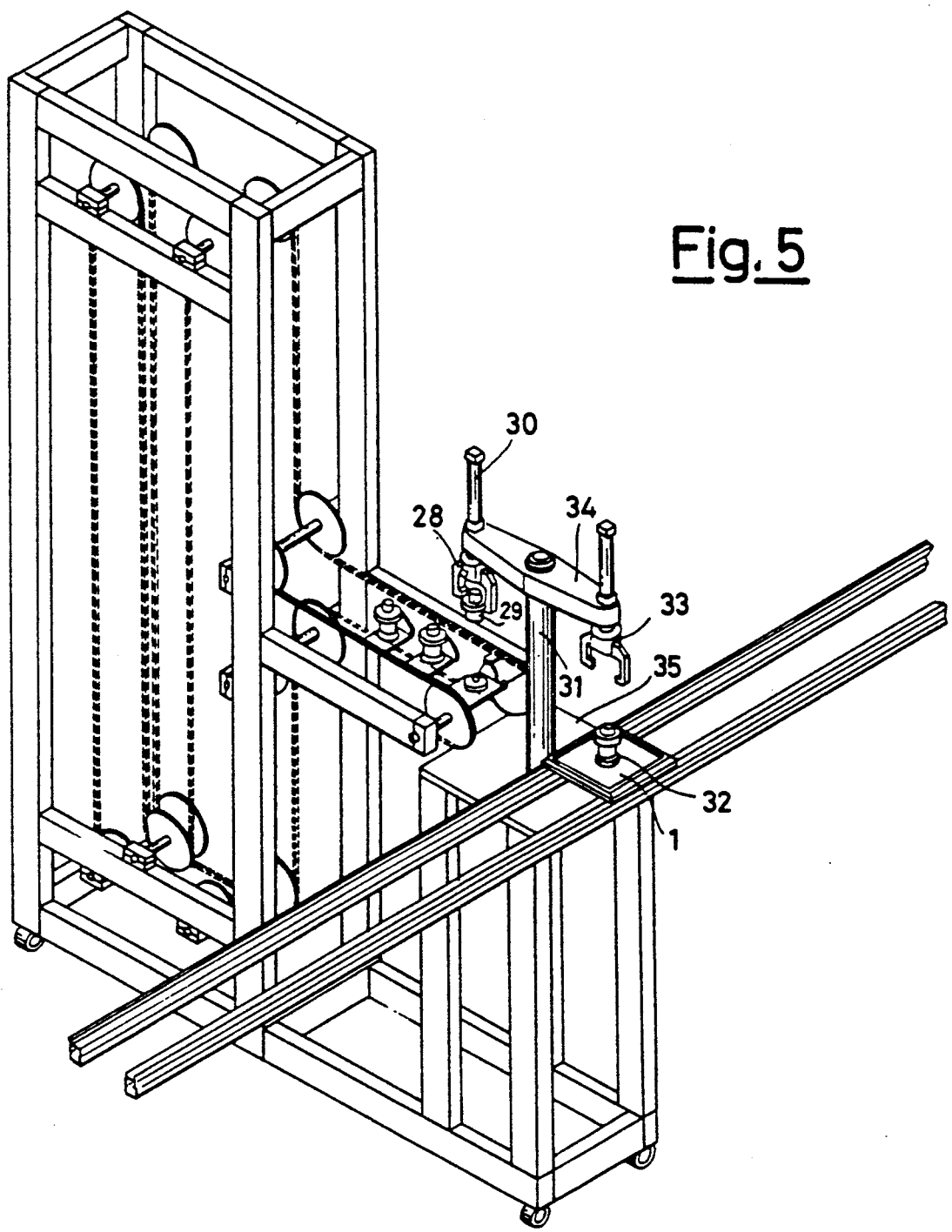
FIG. 5 is a simplified perspective view of an illustrative embodiment of apparatus constructed in accordance with this invention for changing the workpiece holder of FIG. 1 on the pallet of FIG. 1 also in accordance with this invention.

In such systems, double body 9, 10 may be changed as shown, for example, in FIG. 5. In this embodiment, a manipulator with a double gripper is placed alongside the transport system together with a storage unit transporting the workpiece holders on supports fixed between two parallel transport chains. Gripper 28 is associated with the storage unit and is moved by pneumatic cylinder 30, which lowers gripper 28 so that it can grip the workpiece holder with the same pin system as gripper 20 shown in FIG. 4. Cylinder 30 then lifts the gripper up into the position shown in FIG. 5. At the same time, on the other side of manipulator column 31 (i.e., over the transport system), when a pallet without a workpiece but with a workpiece holder 32 different from the one indicated at 29 arrives under gripper 33 which is identical to gripper 28, gripper 33 carries out the same work as gripper 28, gripping workpiece holder 32 and lifting it up away from the pallet. At this point, arm 34, operated by a rod inside column 31 and rotated by the same rotating cylinder (not shown because straightforward) located under plate 35, rotates 180 degrees, thereby reversing the positions of grippers 33 and 28.

Grippers 28 and 33 then respectively descend to the pallet and to the support on the storage unit, thereby reversing the positions of the workpiece holders.

The store chains index in order to bring a new workpiece holder under the gripper. The pallet on the transport system moves on, leaving the place to another pallet with a workpiece holder to be changed.

In this way the workpiece holders of all pallets on the line will be replaced by workpiece holders from the storage unit.

The workpiece holders on the pallets are locked in place in the same manner as shown in FIG. 3; while on the storage unit, the workpiece holders are loosely fitted over a reference pin on the support.

Figure 6:
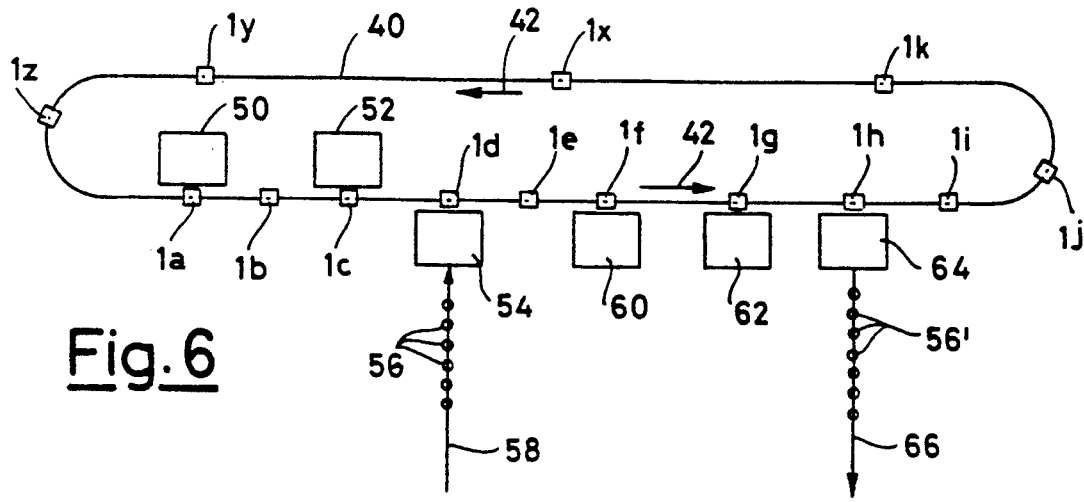
FIG. 6 is a simplified schematic block diagram of a typical assembly line constructed in accordance with this invention.

FIG. 6 shows part of an illustrative embodiment of an electric motor assembly line constructed in accordance with this invention. Endless conveyor 40 conveys pallets 1 in the direction indicated by arrows 42. Element 50 may be storage unit apparatus of the type shown in FIG. 5 for selectively replacing the workpiece holder on a pallet at position 1a. Element 52 may be workpiece holder inverter apparatus of the type shown in FIGS. 3 and 4 for selectively inverting the workpiece holder on a pallet at position 1c. At position 1d, an electric motor part 56 (e.g., a stator or rotor) supplied via conveyor 58 is put on the workpiece holder on pallet 1d by conventional element 54. Elements 50 and 52 are selectively operated to ensure that the pallet at position 1d contains the workpiece holder appropriate for holding a workpiece 56, and that workpiece holder is also properly oriented for receiving such a workpiece. Conventional element 60 performs any conventional manufacturing step on the workpiece on the pallet at position 1f. Conventional element 62 performs another conventional manufacturing step on the workpiece on the pallet at position 1g. At position 1h, conventional element 62 removes the completed workpiece 56' from the pallet and conveys it away via conveyor 66. The empty pallets and workpiece holders are returned to the start of the assembly line for reuse.

Figure 7:
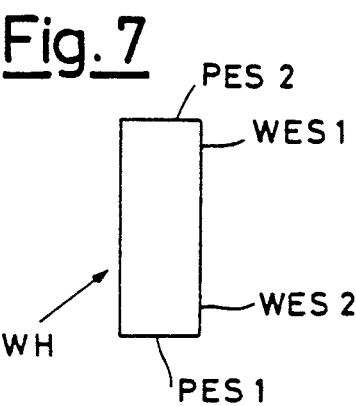
FIG. 7 is a schematic representation of a workpiece holder of the type shown in FIGS. 1-5.
Figure 8:
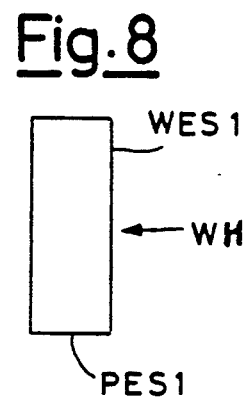
FIGS. 8-10 are schematic representations similar to FIG. 7 of alternative embodiments of the workpiece holder of this invention.
Figure 9:
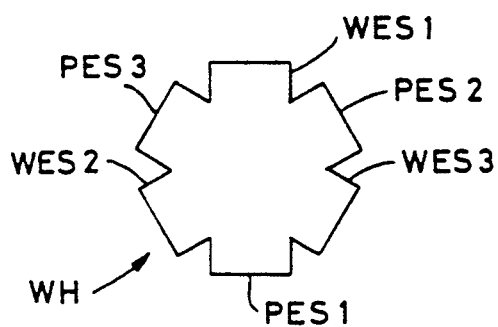
Figure 10:
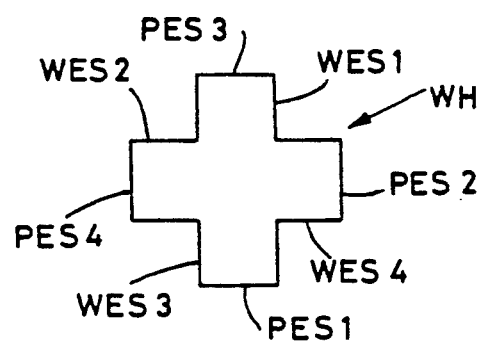

Although in the embodiments shown in FIGS. 1–6 each workpiece holder (abstracted as element WH in FIG. 7) includes two pallet-engaging sites PES1 and PES2 respectively associated with two workpiece-engaging sites WES1 and WES2, this is not necessarily the case, and the workpiece holders of this invention can have other numbers of pallet- and workpiece-engaging sites if desired. For example, FIG. 8 shows a workpiece holder WH having only one pallet-engaging site PES1 and one opposite workpiece-engaging site WES1. Such workpiece holders could be used with apparatus of the type shown in FIG. 5 to enable an assembly line to process differently configured workpieces. As another example, FIG. 9 shows a workpiece holder WH having three pallet-engaging sites PES-1–PES3, each of which is associated with a respective one of three workpiece-engaging sites WES1–WES3. Similarly, FIG. 10 shows a workpiece holder WH having four pallet-engaging sites PES1–PES4, each of which is associated with a respective one of four workpiece-engaging sites WES1–WES4.

We claim:

1. Apparatus for supporting a workpiece comprising: a pallet member;

a workpiece holding having a plurality of pallet-engaging sites ad a plurality of workpiece-engaging sites; and means disposed on said pallet member for releasably engaging said workpiece holder at one of said pallet-engaging sites; wherein;

each individual pallet-engaging site is shaped to independently securely engage said workpiece holder with said pallet member while the remaining pallet-engaging sites are free from engagement with said pallet member;

each individual workpiece-engaging site is shaped for independently securely engaging an entire workpiece; and each of said workpiece-engaging sites is associated with a respective one of said pallet-engaging sites, each said workpiece-engaging site being oriented with respect to its associates pallet-engaging site such that a workpiece-engaging site is positioned to engage a workpiece by engaging its associated pallet-engaging site with said pallet member.

2. The apparatus defined in claim 1 wherein said means for releasably engaging includes locking means for releasably locking said workpiece holder to said pallet member.

3. The apparatus defined in claim 1 wherein said means for releasably engaging comprises a first member, and wherein said pallet-engaging site comprises a second member telescopically engageable with said first member.

4. The apparatus defined in claim 3 further comprising means for releasably locking said workpiece holder to said pallet member.

5. The apparatus defined in claim 4 wherein said means for releasably locking comprises a third member extendable into both of said first and second members along a locking axis transverse to the axis along which said first and second members are telescopically engageable.

6. The apparatus defined in claim 5 wherein said third member is disposed in an aperture in one of said first and second members, and wherein said apparatus further includes means for resiliently urging said third member to project from said aperture into the other of said first and second members.

7. The apparatus defined in claim 6 wherein said means for resiliently urging comprises:
a cam member reciprocable along a reciprocation axis substantially parallel to the axis along which said first and second members are telescopically engageable, said cam member having a cam surface which is mutually transverse to said locking and reciprocation axes for engaging said third member; and
spring means for resiliently urging said cam member to move parallel to said reciprocation axis in the direction which will cause said third member to extend from said aperture into said other of said first and second members.

8. The apparatus defined in claim 7 wherein said first member is a first hollow cylinder having a longitudinal axis substantially parallel to the axis along which said first and second members are telescopically engageable; wherein said second member is a second hollow cylinder having a longitidinal axis substantially parallel to the axis along which said first and second members are telescopically engageable, said first hollow cylinder being telescopically receivable in said second hollow cylinder; wherein said aperture is in said first hollow cylinder; and wherein said cam member is disposed inside said first hollow cylinder.

9. The apparatus defined in claim 8 wherein said third member is a substantially spherical ball.

10. The apparatus defined in claim 9 wherein the inner surface of said second hollow cylinder includes an annular recess for receiving a portion of the surface of said ball when said workpiece holder is releasably locked to said pallet.

11. Apparatus for supporting a workpiece comprising:
a pallet member;
a workpiece holding having a plurality of pallet-engaging sites and a plurality of workpiece-engaging sites, each of said workpiece-engaging sites being associated with a respective one of said pallet-engaging sites; and
means disposed on said pallet member for releasably engaging said workpiece holder at any one of said pallet-engaging sites so that said workpiece holder can hold a workpiece at the workpiece-engaging site associated with the one of said pallet-engaging sites at which said means for releasably engaging engages said workpiece holder, wherein said workpiece holder has (1) a longitudinal axis having opposite first and second ends, (2) first and second pallet-engaging sites respectively adjacent said first and second ends, and (3) first and second workpiece-engaging sites respectively adjacent said second and first ends and respectively associated with said first and second pallet-engaging sites.

12. The apparatus defined in claim 11 wherein all of said pallet-engaging sites are substantially identical to one another.

13. The apparatus defined in claim 11 wherein each of said workpiece-engaging sites is adapted to engage a different workpiece.

14. The apparatus defined in claim 11 wherein said first and second pallet-engaging sites face in opposite directions along said axis.

15. The apparatus defined in claim 14 wherein said first and second workpiece-engaging sites face in opposite directions along said axis.

16. The apparatus defined in claim 15 wherein said first and second pallet-engaging sites and said first and second workpiece-engaging sites are all coaxial with said axis.

17. The apparatus defined in claim 11 wherein said means for releasably- engaging includes locking means for releasably locking said workpiece holder to said pallet member 18. The apparatus defined in claim 11 wherein said means for releasably engaging comprises a first member, and wherein each of said pallet-engaging sites comprises a second member telescopically engageable with said first member.

19. The apparatus defined in claim 18 wherein said means for releasably engaging further comprises means for releasably locking said work-piece holder to said pallet member.

20. The apparatus defined in claim 19 wherein said means for releasably locking comprises a third member extendable into both of said first and second members along a locking axis transverse to the axis along which said first and second members are telescopically engageable.

21. The apparatus defined in claim 20 wherein said third member is disposed in an aperture in one of said first and second members, and wherein said apparatus further includes means for resiliently urging said third member to project from said aperture into the other of said first and second members.

22. The apparatus defined in claim 21 wherein said means for resiliently urging comprises:
a cam member reciprocable along a reciprocation axis substantially parallel to the axis along which said first and second members are telescopically engageable, said cam member having a cam surface which is mutually transverse to said locking and reciprocation axes for engaging said third member; and
spring means for resiliently urging said cam member to move parallel to said reciprocation axis in the direction which will cause said third member to extend from said aperture into said other of said first and second members.

23. The apparatus defined in claim 22 wherein said first member is a first hollow cylinder having a longitudinal axis substantially parallel to the axis along which said first and second members are telescopically engageable; wherein said second member is a second hollow cylinder having a longitudinal axis substantially parallel to the axis along which said first and second members are telescopically engageable, said first hollow cylinder being telescopically receivable in said second hollow cylinder; wherein said aperture is in said first hollow cylinder; and wherein said cam member is disposed inside said first hollow cylinder.

24. The apparatus defined in claim 23 wherein said third member is a substantially spherical ball.

25. The apparatus defined in claim 24 wherein the inner surface of said second hollow cylinder includes an annular recess for receiving a portion of the surface of said ball when said workpiece holder is releasably locked to said pallet.

* * * * *